United States Patent
Kurigata

(10) Patent No.: US 8,406,543 B2
(45) Date of Patent: Mar. 26, 2013

(54) IMAGE DECODING APPARATUS AND IMAGE DECODING METHOD

(75) Inventor: Yuhei Kurigata, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 348 days.

(21) Appl. No.: 12/882,011

(22) Filed: Sep. 14, 2010

(65) Prior Publication Data

US 2011/0064323 A1 Mar. 17, 2011

(30) Foreign Application Priority Data

Sep. 17, 2009 (JP) .................................. 2009-215871

(51) Int. Cl.
G06K 9/36 (2006.01)
G06K 9/46 (2006.01)
G06K 9/40 (2006.01)
H04B 1/66 (2006.01)
H04N 7/12 (2006.01)
H04N 11/02 (2006.01)
H04N 11/04 (2006.01)

(52) U.S. Cl. .................... 382/233; 382/275; 375/240.25

(58) Field of Classification Search .................. 382/233, 382/275; 375/240.25
See application file for complete search history.

(56) References Cited

U.S. PATENT DOCUMENTS

| 2005/0141619 A1* | 6/2005 | Kondo et al. ............ 375/240.24 |
| 2006/0067409 A1* | 3/2006 | Onoda et al. ............ 375/240.25 |
| 2008/0205788 A1* | 8/2008 | Hattori ..................... 382/275 |
| 2009/0214127 A1* | 8/2009 | Suzuki ..................... 382/232 |

FOREIGN PATENT DOCUMENTS

JP 2005-160117 6/2005

* cited by examiner

*Primary Examiner* — Bernard Krasnic

(74) *Attorney, Agent, or Firm* — Finnegan, Henderson, Farabow, Garrett & Dunner, L.L.P.

(57) ABSTRACT

An image decoding apparatus and method are capable of reducing block noise without difference in gradation being lost, wherein, an image is divided into a plurality of blocks containing a plurality of pixels and the pixels are encoded with label information corresponding to representative values which represent gradation of pixels in the block, and when the size in the dynamic range (distribution range of gradation) of a focused block is not less than a prescribed multiple times the size in the dynamic range in an adjacent block, a representative value, in the focused block, whose difference from the intermediate value of representative values of the adjacent block is not more than a threshold value, is assumed to be adjusted, and a variance is provided to the representative value in a decoding process.

10 Claims, 13 Drawing Sheets

FIG. 7a

DIFFERENCE BETWEEN MAXIMUM AND MINIMUM(DYNAMIC RANGE)=174
INTERMIDIATE VALUE=91

DIFFERENCE BETWEEN MAXIMUM AND MINIMUM(DYNAMIC RANGE)=60
INTERMIDIATE VALUE=215

52A / 51A

| 00 | 00 | 11 | 11 | 01 | 10 | 00 | 10 |
|----|----|----|----|----|----|----|----|
| 00 | 01 | 11 | 11 | 10 | 01 | 10 | 00 |
| 01 | 11 | 11 | 11 | 01 | 11 | 00 | 10 |
| 11 | 11 | 11 | 11 | 10 | 01 | 11 | 01 |

FOCUSED BLOCK — REFERENCE BLOCK

| 4 | 4 | 178 | 178 | 205 | 225 | 185 | 225 |
|---|---|-----|-----|-----|-----|-----|-----|
| 4 | 62 | 178 | 178 | 225 | 205 | 225 | 185 |
| 62 | 178 | 178 | 178 | 205 | 245 | 185 | 225 |
| 178 | 178 | 178 | 178 | 225 | 205 | 245 | 205 |

FOCUSED BLOCK — REFERENCE BLOCK

| 4 | 4 | 168 | 188 | 205 | 225 | 185 | 225 |
|---|---|-----|-----|-----|-----|-----|-----|
| 4 | 62 | 188 | 208 | 225 | 205 | 225 | 185 |
| 62 | 148 | 168 | 168 | 205 | 245 | 185 | 225 |
| 188 | 168 | 148 | 188 | 225 | 205 | 245 | 205 |

FOCUSED BLOCK — REFERENCE BLOCK

FIG. 9

| | NUMBER OF ADJACENT PIXEL | DYNAMIC RANGE | INTERMIDIATE VALUE | EVENT PROBABILITY | | | | REFERENCE BLOCK CONFORMITY JUDGMENT RESULT |
|---|---|---|---|---|---|---|---|---|
| | | | | FIRST REPRESENTATIVE VALUE | SECOND REPRESENTATIVE VALUE | THIRD REPRESENTATIVE VALUE | FOURTH REPRESENTATIVE VALUE | |
| FOCUSED BLOCK | - | 174 | 91 | - | - | - | - | - |
| ADJACENT BLOCK A | 2 | 80 | 165 | 3/16 | 5/16 | 4/16 | 4/16 | NO |
| ADJACENT BLOCK B | 4 | 55 | 210 | 5/16 | 3/16 | 4/16 | 4/16 | YES |
| ADJACENT BLOCK C | 3 | 32 | 205 | 10/16 | 4/16 | 1/16 | 1/16 | YES |
| ADJACENT BLOCK D | 1 | 180 | 84 | 1/16 | 4/16 | 5/16 | 6/16 | NO |

FIG. 10a
DIFFERENCE BETWEEN MAXIMUM AND MINIMUM(DYNAMIC RANGE)=174
INTERMIDIATE VALUE=91
DIFFERENCE BETWEEN MAXIMUM AND MINIMUM(DYNAMIC RANGE)=60
INTERMIDIATE VALUE=215
| 00 | 00 | 11 | 11 | 01 | 10 | 00 | 10 |
| 00 | 01 | 11 | 11 | 10 | 01 | 10 | 00 |
| 01 | 11 | 11 | 11 | 01 | 11 | 00 | 10 |
| 11 | 11 | 11 | 11 | 10 | 01 | 11 | 01 |
FOCUSED BLOCK    REFERENCE BLOCK
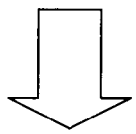
FIG. 10b
| 4 | 4 | 178 | 178 | 205 | 225 | 185 | 225 |
| 4 | 62 | 178 | 178 | 225 | 205 | 225 | 185 |
| 62 | 178 | 178 | 178 | 205 | 245 | 185 | 225 |
| 178 | 178 | 178 | 178 | 225 | 205 | 245 | 205 |
FOCUSED BLOCK    REFERENCE BLOCK
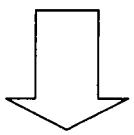
FIG. 10c
| 4 | 4 | 148 | 188 | 205 | 225 | 185 | 225 |
| 4 | 62 | 188 | 148 | 225 | 205 | 225 | 185 |
| 62 | 208 | 148 | 188 | 205 | 245 | 185 | 225 |
| 188 | 168 | 208 | 168 | 225 | 205 | 245 | 205 |
FOCUSED BLOCK    REFERENCE BLOCK

IMAGE DECODING APPARATUS AND IMAGE DECODING METHOD

This application is based on Japanese Patent Application No. 2009-215871 filed on Sep. 17, 2009 in Japanese Patent Office, the entire content of which is hereby incorporated by reference.

TECHNICAL FIELD

The present invention relates to an image decoding apparatus and image decoding method for decoding the image data which is formed by dividing an image into a plurality of blocks and encoding for each block.

BACKGROUND OF THE INVENTION

One of the image information encoding methods is the BTC (Block Truncation Coding) wherein an image to be encoded is divided into a plurality of blocks and is encoded for each block. Generally, in the BTC method, image information is divided into rectangular blocks each consisting of "n" by "m" pixels (e.g., 4 by 4 pixels), and each block is encoded in such a way as to be expressed by one or a plurality of representative values representing the gradation values of the pixel pertaining to the block, and the label information to indicate the compatibility between each pixel pertaining to the block and the representative value. The BTC is an encoding method with attention being given to the fact that the distribution range of gradation value is comparatively small within one block even for the original image wherein the distribution range of gradation to be occupied by each pixel is 256 gradations, for example.

FIG. 11 shows an example of encoding image data by BTC. FIG. 12 shows an example of decoding the encoded image data. In this example, original image data 80 for one block of four by four pixels wherein each pixel is represented in 8 bits (256 gradations) is encoded in label information of 2 bits (4 gradations) per pixel.

In FIG. 11, maximum value 178 and minimum value 4 of the gradation values within block 80 are detected at the time of encoding, and the range of distribution wherein these values constitute both ends is divided into four equal parts. The pixel wherein gradation value D is represented by the maximum value 178≧D>135, is encoded into 2-bit label information "11", the pixel of 135≧D>91 is encoded into label information "10", the pixel of 91≧D>48 is encoded into label information "01", and the pixel of 48≧D≧the minimum value 4 is encoded into label information "00". Encoded image data 81 of the block 80 includes the label information (32 bit) for these 16 pixels, and four representative values corresponding to the label information or the information capable of calculating these four representative values, e.g., the difference between the maximum value and minimum value (the difference between maximum and minimum) and intermediate value, or the maximum value 178 and minimum value 4. FIGS. 11 and 12 show examples of using the difference between maximum and minimum and an intermediate value.

As shown in FIG. 12, at the time of decoding, each piece of label information is converted to the pixel wherein the representative value corresponding to the label information is the decoded value (gradation value). In the example of FIG. 12, four representative values are calculated from the difference between maximum and minimum and the intermediate value in the first place. In this case, the first representative value corresponding to the label information "00" is calculated as {the intermediate value−(the difference between maximum and minimum/2)}; the second representative value corresponding to the label information "01" is calculated as {the first representative value+(the difference between maximum and minimum/3)}; the third representative value corresponding to the label information "10" is calculated as {the first representative value+2×(the difference between maximum and minimum/3)}; and the fourth representative value corresponding to the label information "11" is calculated as {the first representative value+(the difference between maximum and minimum)}. Each piece of label information is converted into the corresponding representative value, and hence into decoded image data 82 for one block.

When the aforementioned method is used for encoding and decoding, grid-like noise known as "block noise" occurs when continuity of image data between adjacent blocks is deteriorated. In the aforementioned BTC, for example, in a block including the outline (edge portion) of text and ground color portion, there will be an increase in the range of distribution of the gradation value of the pixel inside the block (the difference between maximum and minimum: dynamic range). This will increase the gradation range expressed by one representative value having a limited number of gradations, and subtle difference in gradation will not be reproduced. In the meantime, in a block (e.g., a block of ground color alone) with smaller dynamic range free of an edge or the like, a subtle difference in gradation is reproduced even with representative values having a limited number of gradations. Thus, if there is a conspicuous difference in the dynamic range between adjacent blocks, a subtle difference in gradation reproduced in the blocks having a narrower dynamic range will be lost in the blocks with a wider dynamic range. Due to this discontinuity of gradation between adjacent blocks, more perceivable block noise is produced in the conventional method.

For example, FIG. 13 shows a case when the first block (dynamic range: 60) as the portion of ground color and the second block (dynamic range: 174) including the ground color and edge are adjacent to each other, and shows encoded image data 51A of the first block and 52A of the second block and decoded image data 51B and 52B obtained by decoding the same. In the encoded image data 52A, the portion wherein the label information is "11" represents the ground color portion following the adjacent first block. In the decoded image data 51B of the first block, the subtle difference in gradation of the ground color is reproduced. In the decoded image data 52B of the adjacent second block, the portion of ground color is encoded uniformly to the same gradation value (178) and the difference in gradation is lost. Thus, the boundary between blocks is conspicuous and block noise is produced.

An example of a device capable of removing the block distortion occurring at the time of decoding includes an image signal decoding apparatus wherein a low-path filter is applied to the pixels closer to the block boundary inside the decoded image (e.g., Unexamined Japanese Patent Application Publication No. 2005-160117). In this device, the passband characteristic, of the low-path filter applied to the pixels closer to the block boundary, is changed in response to the dynamic range of the detected block, and the block distortion produced at the time of decoding is removed without deteriorating the edge and details.

In the device disclosed in the aforementioned Unexamined Japanese Patent Application Publication No. 2005-160117, a low-path filter is applied to the pixel close to the block boundary, therefore, this method has the disadvantage of the subtle difference in gradation being lost.

In view of the problems described above, it is an object of the present invention to provide an image decoding apparatus and an image decoding method capable of reducing block noise without the subtle difference in gradation being lost.

SUMMARY OF THE INVENTION

One aspect of the present invention is as follows:

An image decoding apparatus for decoding an encoded image data wherein each block obtained by dividing an image into a plurality of blocks is expressed by one or a plurality of representative values that represent gradation value of a pixel pertaining to the block, and label information that shows which of each pixel pertaining to the block corresponds to which of the representative values, the image decoding apparatus is further characterized in that, when each of the pixels in a focused block (block of focus) is decoded according to the representative value and when the size in the range of distribution of the representative value in the focused block is greater than or equal to a prescribed times the size in the range of distribution of the representative value in an adjacent block, out of the representative values of the focused block, the representative value whose difference from the intermediate value or mean value of the representative value of said adjacent block does not exceed a first threshold value is assumed to be an adjusted representative value (representative value of which value is to be adjusted in decoding process) in a prescribed relationship of approximation, and a variance is provided to the decoded value of the pixel possessing the label information corresponding to the adjusted representative value.

A second aspect of the present invention is as follows:

The image decoding apparatus described in Aspect (1), wherein variance is provided so as to make the distribution of the decoded value of the pixel, possessing the label information corresponding to the adjusted representative value, closer to the distribution of the representative value in the adjacent block.

A third aspect of the present invention is as follows:

The image decoding apparatus described in Aspect (2), wherein the variance is provided so as to vary the decoded value of the pixel, possessing the label information corresponding to the adjusted representative value, in the pattern that corresponds to the sequence pattern of the decoded value in the adjacent block.

A fourth aspect of the present invention is as follows:

The image decoding apparatus described in Aspect (1) wherein one of the requirements for qualifying the adjusted representative value is that, in the focused block, the number of pixels possessing the label information corresponding to the representative value thereof is equal to or greater than a second threshold value.

A fifth aspect of the present invention is as follows:

The image decoding apparatus described in Aspect (1) wherein one of the requirements for qualifying the adjusted representative value is that, in the focused block, the number of pixels possessing the label information corresponding to the representative value thereof and located at the boundary with an adjacent block is equal to or greater than a third threshold value.

BRIEF DESCRIPTION OF THE DRAWINGS

FIGS. 7a, 7b and 7c are reference diagrams showing an effect of block noise reduction process;

FIG. 9 is an explanatory diagram illustrating a tabulated list of various values in the four adjacent blocks of FIG. 8 and a determination result of conformity as a reference block;

FIGS. 10a, 10b and 10c are explanatory diagrams showing an example of assigning variances to each representative value in a focused block according to a sequence pattern of each representative value in the reference block;

DETAILED DESCRIPTION OF THE PREFERRED EMBODIMENTS

The present invention is described in further detail below with reference to specific embodiments in conjunction with the accompanying drawings.

First Embodiment

Figure 1:
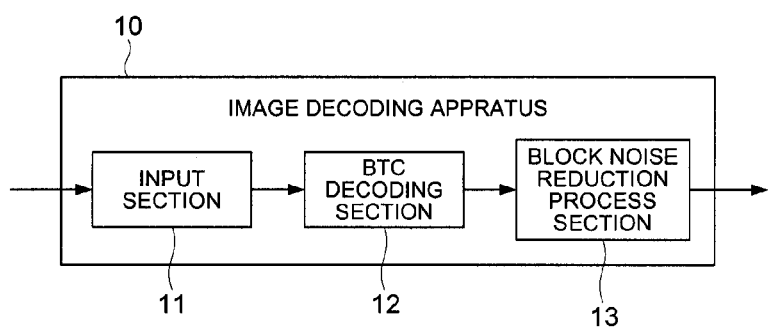
FIG. 1 is a block diagram representing a schematic configuration of the image decoding apparatus in an embodiment of the present invention.

FIG. 1 shows a schematic configuration of image decoding apparatus 10 in an embodiment of the present invention. The image decoding apparatus 10 includes input section 11 configured to input encoded image data as the image data to be decoded, BTC decoding section 12 configured to perform a first-phase decoding process to decode the encoded image data having been inputted by the input section 11, and block noise reduction process section 13 configured to perform a second-phase decoding process to reduce the block noise of the image data decoded by the BTC decoding section 12. These components can be composed of a sequencer with a built-in micro-program or a hardware circuit such as a logical circuit. It is also possible to achieve the same functions by executing a prescribed program in an information processing device provided with a CPU (Central Processing Unit), ROM (Read Only Memory), and RAM (Random Access Memory).

Figure 2:
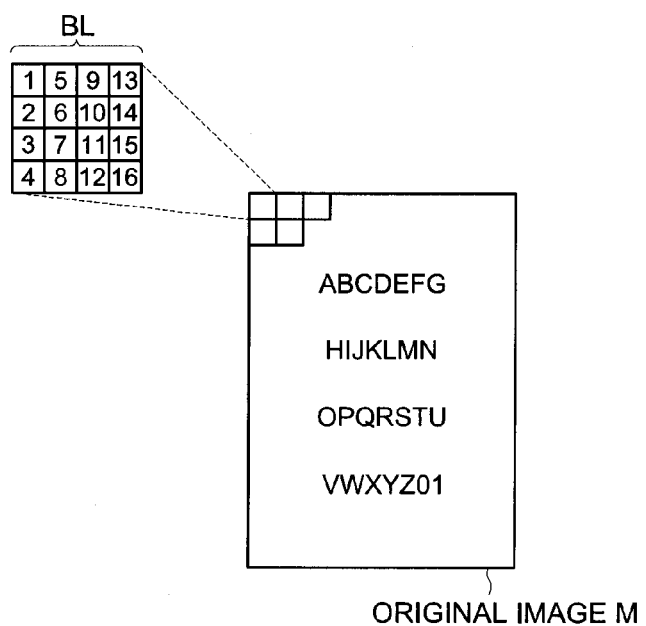
FIG. 2 is an explanatory diagram schematically showing how an original image is divided into blocks.
Figure 11:
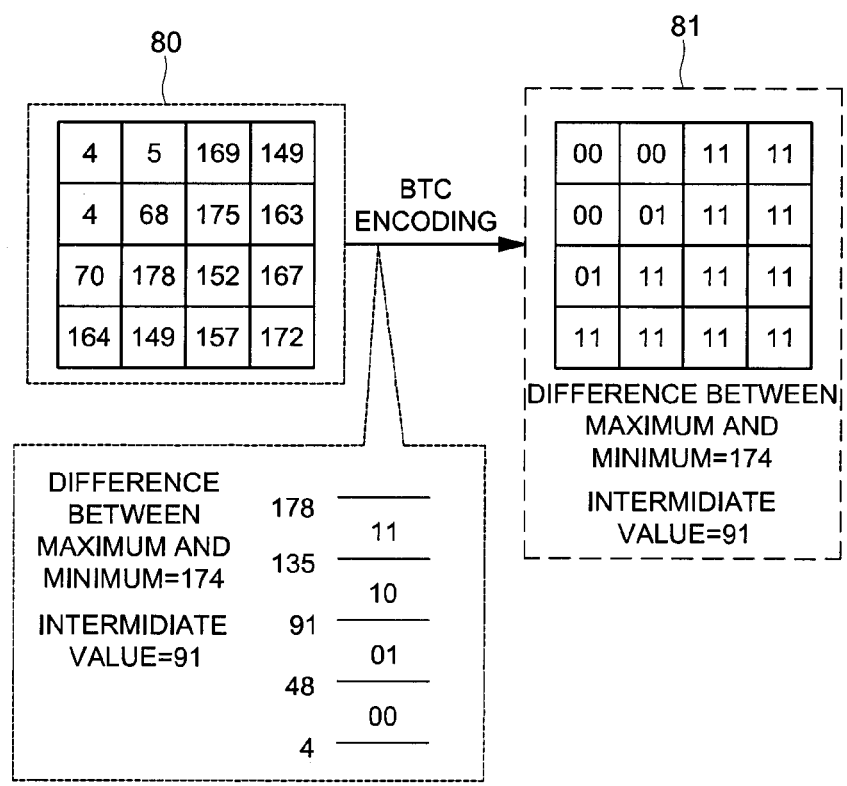
FIG. 11 is an explanatory diagram showing an example of encoding an image data via BTC.
Figure 12:
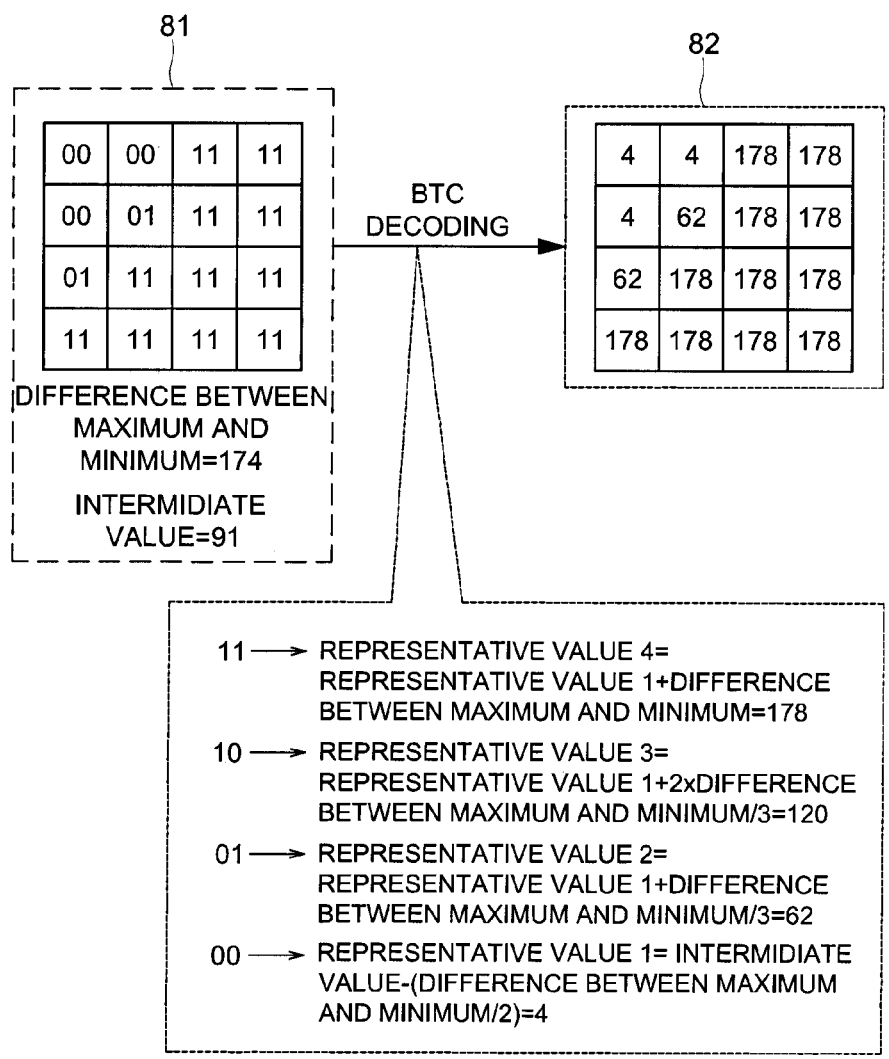
FIG. 12 is an explanatory diagram showing an example of decoding an encoded image data in a first-phase decoding process via BTC.
Figure 13:
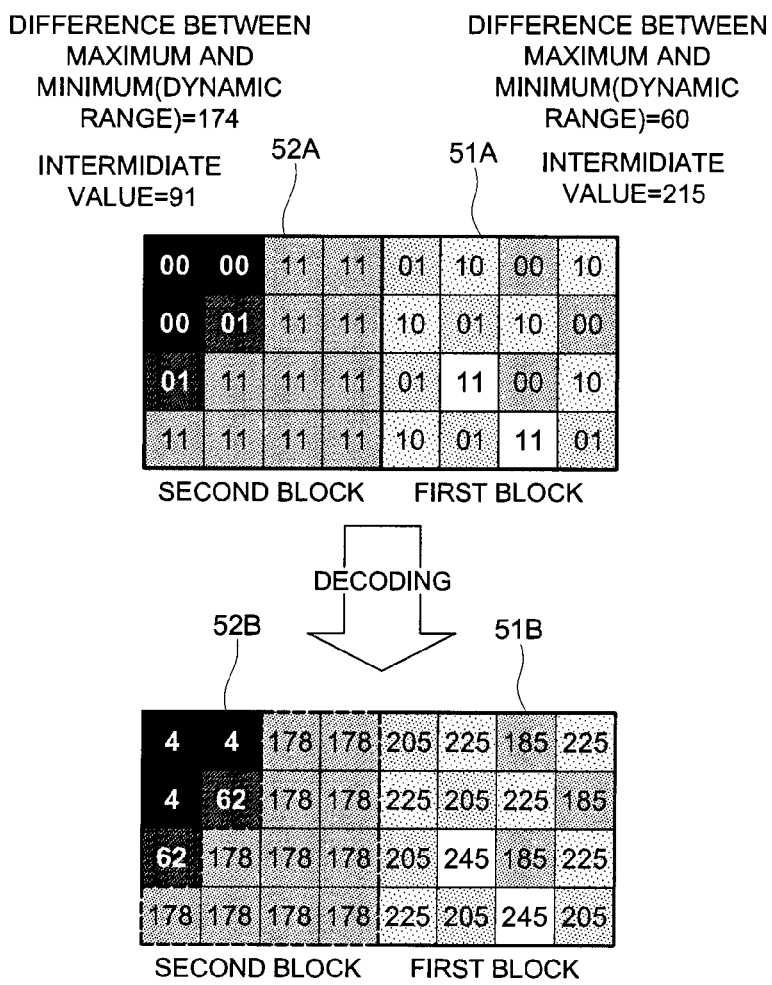
FIG. 13 is an explanatory diagram showing the difference in gradation in a decoded image obtained via BTC encoding and decoding of two blocks wherein there is a conspicuous difference in the dynamic range between the focused block and an adjacent block.

The encoded image data to be decoded in the image decoding apparatus 10 is the image data encoded via BTC-method as shown in FIG. 11. More specifically, each block obtained by dividing an image into a plurality of parts is expressed by one or a plurality of representative values representing the gradation value of the pixel pertaining to that block, and the label information for indicating the compatibility between pixels pertaining to the block and the representative value. For example, the encoded image data to be decoded is generated wherein, one A4-sized original image M having a resolution of 600 dpi, for example, is divided into a plurality of blocks BL of 4 by 4 pixels, each of blocks BL is sequentially encoded using the left top as a base point, as shown in FIG. 2. For example, each of the blocks is sequentially encoded from the left top to the right. When the right end has been reached, sequential encoding is restarted from the left end to the right end immediately after downward movement by one block. Repetition of this process achieves one entire original image M to be encoded.

Figure 3:
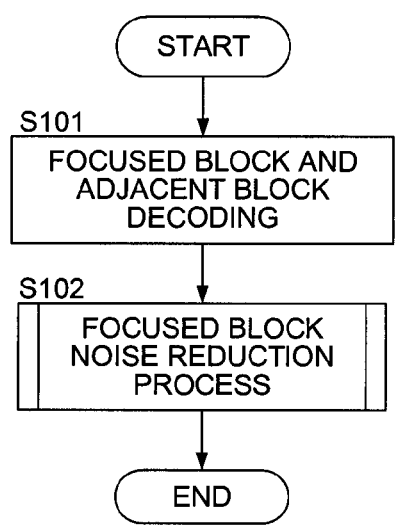
FIG. 3 is a flow diagram representing the processing of a focused block being decoded by the image decoding apparatus in an embodiment of the present invention.

FIG. 3 shows the flow of processing when a focused block is decoded by the image decoding apparatus 10. The image decoding apparatus 10 allows the focused block and the adjacent block thereof to be decoded via the BTC decoding section 12 in the first-phase decoding process (Step S101). After that, in the second-phase decoding process, the focused block is subjected to a block noise reducing process by the block noise reduction process section 13 (Step S102).

The first-phase decoding process is a normal BTC decoding process as shown in FIG. 11. More specifically, the label information for each pixel is converted into the representative value (gradation value) corresponding to the label information as decoded value.

In the second-phase block noise reducing process, when prescribed requirements have been met as exemplified by the requirement that the dynamic range (size in the range of distribution of the representative values) of the focused block should be equal to or greater than R times (e.g., two times) the dynamic range of the adjacent block, the difference in gradation in the adjacent block having a smaller dynamic range is determined as having been deteriorated in the focused block having a wider dynamic range. The pattern of variances of the decoded value in that adjacent block is reflected in the focused block. The following describes details of the block noise reducing process.

Figure 4:
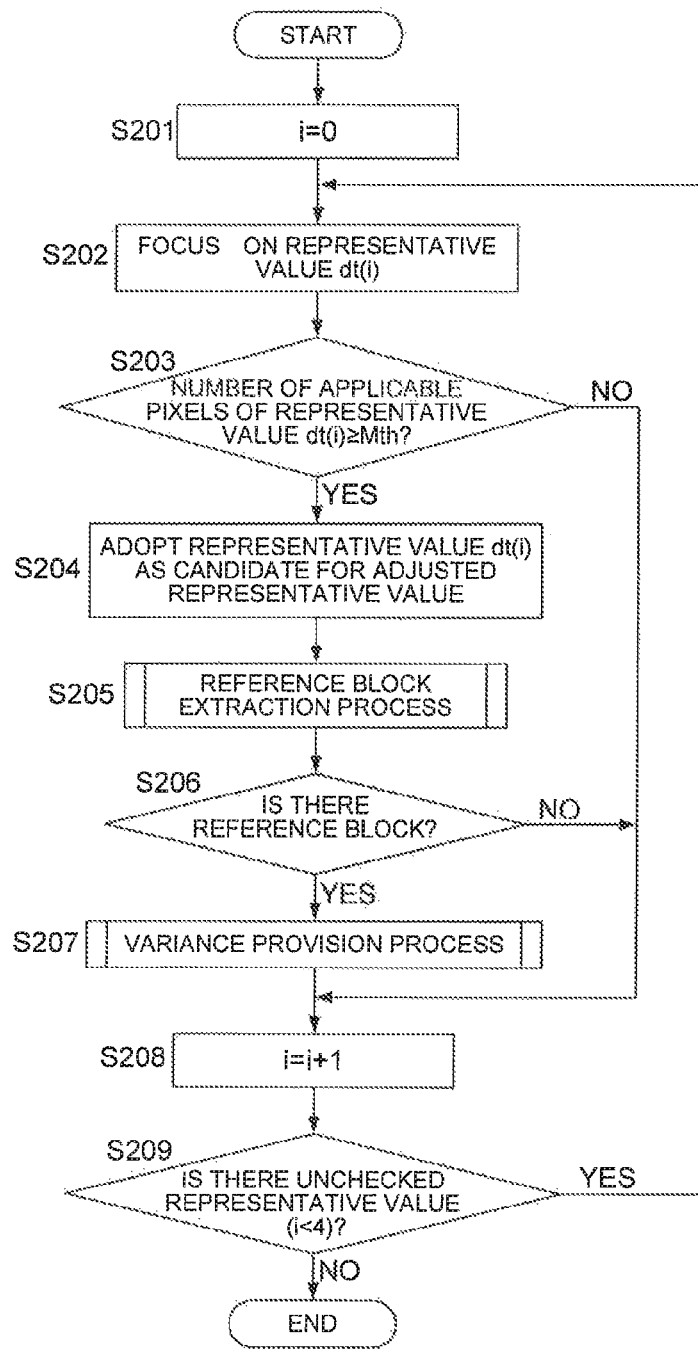
FIG. 4 is an overall flow diagram showing a method of reducing block noise in the image decoding apparatus in an embodiment of the present invention (Step S102 of FIG. 3)

FIG. 4 shows an overall flow of the block noise reducing process. Evaluation is made whether or not each representative value in the focused block can be a candidate for adjusted representative value (candidate representative value for assigning variances of the adjacent block). If the requirements for a candidate for adjusted representative value are met, further evaluation is made to determine whether or not there is an adjacent block, which conforms with the requirement as a source to assign variances to that candidate for adjusted representative value, to be extracted as a reference block. If a reference block is present, the candidate for adjusted representative value is used as the representative value to be adjusted (adjusted representative value), and variances are provided to the decoded value of the pixels possessing the label information corresponding to the adjusted representative value in the focused block in such a way that the variance of the decoded value in the reference block will be reflected.

In that case, assuming that four representative values are set for one block, and 0 through 3 (00, 01, 10, 11 in binary notation) are provided as the label information thereof. In this process, the variable "i" is first initialized to 0 (Step S201). Focusing attention on the representative value dt (i) having the label information of "i" (Step S202), evaluation is made to determine whether or not the number of the pixels to which the representative value dt (i) (pixel having "i" in the label information) is applied is equal to or greater than a predetermined threshold value Mth (Mth=Mthreshold) (Step S203).

When the number of the pixels is equal to or greater than the predetermined threshold value Mth (Step S203; Yes), the representative value dt (i) is adopted as the candidate for adjusted representative value dt (Step S204). More specifically, when a wide area of the focused block is occupied by the representative value dt (i), block noise occurs. Thus, the representative value meeting such requirements is assumed as a candidate for adjusted representative value. This is followed by the step of reference block extraction for extracting a reference block compatible with the candidate for adjusted representative value dt (Step S205). If a reference block is extracted during reference block extraction (Step S206; Yes), the candidate for adjusted representative value dt (representative value dt (i)) is assumed to be the adjusted representative value dt, and variance provision process is applied so that variance is provided to the decoded value of the pixel (pixel having "i" in the label information) possessing the label information corresponding to the adjusted representative value dt (Step S207).

After that, or if the result of evaluation in Step S203 is below Mth (Step S203; No), the variable "i" is incremented by "1" (Step S208). If "i"<4, namely, if there is an unchecked representative value (Step S209; Yes), the process goes back to Step S202, and process continues. If "i"<4 is not satisfied (Step S209; No), this process terminates.

Figure 5:
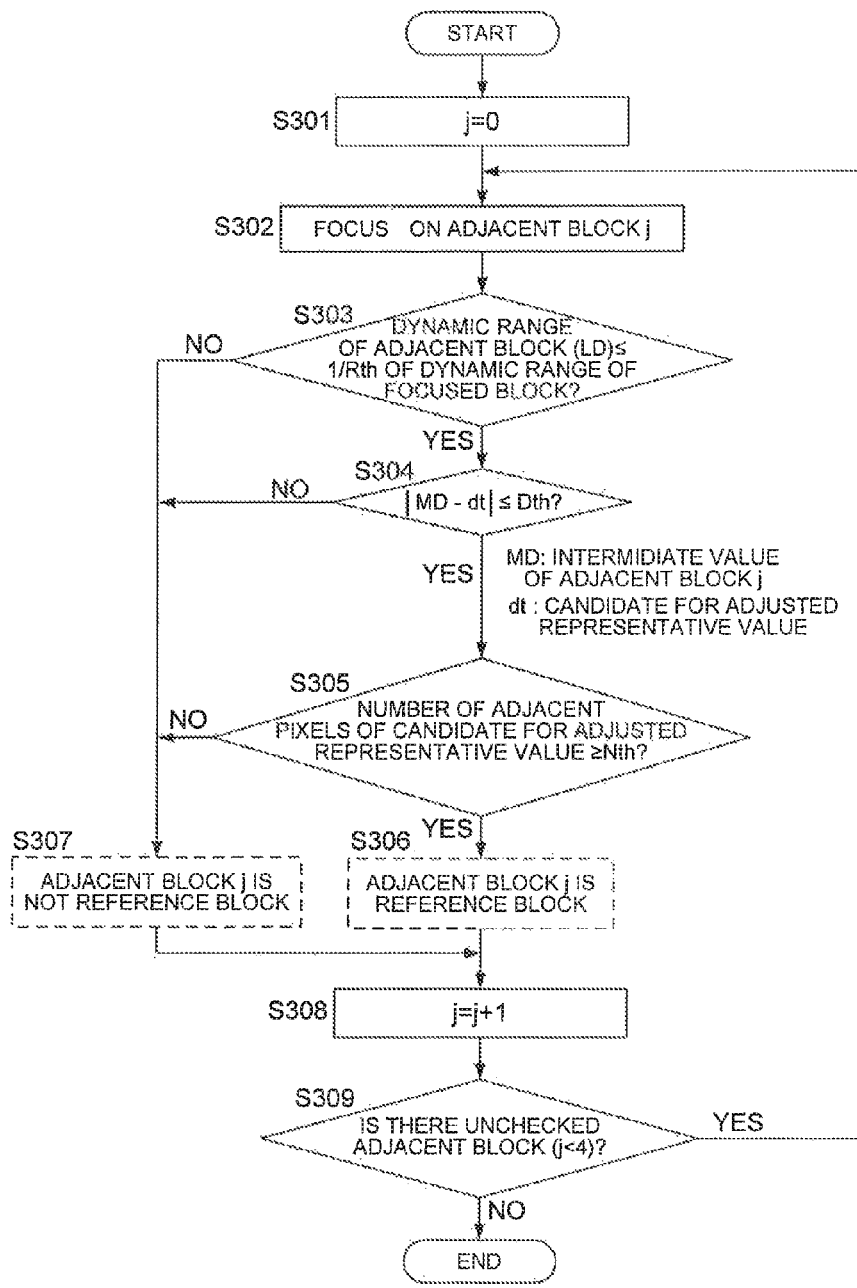
FIG. 5 is a flow diagram showing details of a reference block extraction process (Step S205 of FIG. 4)

FIG. 5 shows details of the reference block extraction process (Step S205 in FIG. 4). In this process, evaluation is made to determine whether or not each of the four adjacent blocks on the top, bottom, left, and right of the focused block can be the reference block compatible with the candidate for adjusted representative value dt. In the first place, the variable "j" is initialized to 0 (Step S301). Then with attention focused on the adjacent block "j" (Step S302), evaluation is made to determine whether or not the dynamic range of the adjacent block "j" (LD) is not more than 1/Rth (Rth=Rthreshold) of the dynamic range of the focused block (Step S303). More specifically, only when there is a big difference in the dynamic range between the focused block and an adjacent block, block noise is produced. In the evaluation, this is assumed as one of the requirements that allow the adjacent block "j" to become a reference block.

If the dynamic range of the adjacent block "j" (LD) is not more than 1/Rth of the dynamic range of the focused block (Step S303; Yes), evaluation is made to determine whether or not the difference between intermediate value MD of the representative values of the adjacent block "j" and the candidate for adjusted representative value dt is not more than predetermined threshold value Dth (Dth=Dthreshold) (Step S304). When there is a conspicuous difference between the intermediate value MD of the adjacent block "j" and the candidate for adjusted representative value dt, the area of the adjacent block "j" in the original image and the area wherein the candidate for adjusted representative value dt is assigned in the focused block at the time of encoding are considered to have separate pixel values without any relationship such as constituting part of a continuous ground color. Thus, that the difference between the intermediate value MD of the adjacent block "j" and the candidate for adjusted representative value dt should is not more than the threshold value Dth is one of the evaluation requirements that allow the adjacent block "j" to become a reference block compatible with the candidate for adjusted representative value dt.

When the difference between the intermediate value MD, of the adjacent block "j" and the candidate for adjusted representative value dt does is not more than the threshold value Dth (Step S304; Yes), evaluation is made to determine whether or not the number of pixels adjacent to the pixel wherein the candidate for adjusted representative value dt is applied is equal to or greater than threshold value Nth (Nth=Nthreshold). More specifically, if there is a small number of (or no) pixels adjacent to the candidate for adjusted representative value dt, they cannot be considered as block noise. Thus, that the number of the pixels adjacent to the pixel wherein the candidate for adjusted representative value dt is applied should be equal to or greater than the threshold value Nth is one of the evaluation requirements that allow the adjacent block "j" to become a reference block.

When the number of the pixels adjacent to the adjacent block "j" wherein the candidate for adjusted representative value dt is applied is equal to or greater than the threshold value Nth (Step S305; Yes), the adjacent block "j" is extracted as a reference block (Step S306) and the operation goes to Step S308.

When the dynamic range of the adjacent block "j" (LD) is more than 1/Rth of the dynamic range of the focused block (Step S303; No), when the difference between the intermediate value MD of the adjacent block "j" and the candidate for adjusted representative value dt is more than the threshold value Dth (Step S304; No), or when the number of the pixels adjacent to the pixel wherein the candidate for adjusted representative value dt is applied is less than the threshold value Nth (Step S305; No), evaluation is made to determine that the adjacent block "j" is not a reference block (Step S307) and the process goes to Step S308.

In Step S308, variable "j" is incremented by "1". When "j"<4, namely, when there is an unchecked adjacent block (Step S309; Yes), the process goes back to Step S302, and process continues. If "j"<4 is not satisfied (Step S309; No), this process terminates.

Figure 6:
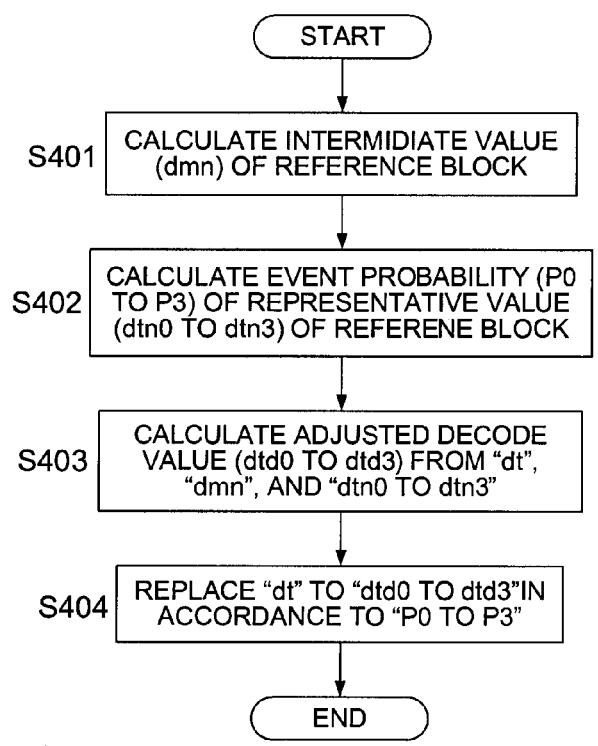
FIG. 6 is a flow diagram showing details of a process of assigning variances (Step S207 of FIG. 4)

FIG. 6 shows details of the variance provision process (Step S207 of FIG. 4). In this process, variance in conformity to the variance of the decoded values (representative values) inside adjacent block (reference block) extracted in the reference block extraction process is given to the decoded value of the pixel wherein the adjusted representative value dt inside the focused block has been applied.

In the first place, intermediate value dmn of a reference block is calculated (Step S401). This is followed by the step of calculating the event probability (P0 through P3) of each representative value (dtn0 through dtn3) of the reference block (Step S402).

The next step is to calculate the adjusted decoded value (dtd0 through dtd3) as a decoded value that have been assigned variance to the adjusted representative value, from the adjusted representative value dt, the intermediate value dmn of the reference block and each representative value (dtn0 through dtn3) of the reference block (Step S403). In this case, the result of assigning the difference between the adjusted representative value dt and the intermediate value dmn of the reference block to the representative value (dtn0 through dtn3) of the reference block is assumed to be an adjusted decoded value (dtd0 through dtd3). More specifically, the adjusted decoded value (dtd0 through dtd3) is determined in such a way as to ensure that the difference in the representative value (dtn0 through dtn3) of the reference block with respect to the intermediate value dmn of the reference block will be equal to the difference in the adjusted decoded value (dtd0 through dtd3) with respect to the adjusted representative value dt.

In the next step, the decoded value of the pixel, wherein the adjusted representative value dt is applied, is replaced by the adjusted decoded values (dtd0 through dtd3) in conformity to the event probability P0 through P3 (Step S404). Then this process terminates. More specifically, the number of the pixels assigned to each of the adjusted decoded values dtd0 through dtd3 is determined so as to ensure that the event probability of adjusted decoded values dtd0 through dtd3 in the area wherein the adjusted representative value dt (area of the pixel having the label information corresponding to the adjusted representative value dt) will be equal to the event probability (P0 through P3) of the representative values (dtn0 through dtn3) of the reference block. According to this assignment, the decoded value of the pixel wherein the adjusted representative value dt is applied is replaced by the adjusted decoded values (dtd0 through dtd3). In this case, these adjusted decoded values (dtd0 through dtd3) are placed in random arrangement.

FIGS. 7a, 7b and 7c are reference diagrams showing advantages of the block noise reducing process. FIG. 7a shows encoded image data 52A of the focused block and encoded image data 51A of the adjacent block FIG. 7b shows first-phase decoded data 52B as the decoded data obtained from the encoded image data 52A of the focused block provided with the first-phase decoding processing, and first-phase decoded data 51B as the decoded data obtained from the encoded image data 51A of the adjacent block provided with the first-phase decoding processing. FIG. 7c shows second-phase decoded data 52C as decoded data obtained from the first-phase decoded data 52B of the focused block provided with second-phase decoding processing, and second-phase decoded data 51C as decoded data obtained from the encoded image data 51B of the adjacent block provided with second-phase decoding processing. FIGS. 7a and 7b are the same as FIGS. 10a and 10b, respectively.

In FIGS. 7a, 7b and 7c, the threshold values used in the second-phase decoding process (block noise reducing process) are set at Mth=8, Rth=2, Dth=40 and Nth=3. In the example of FIGS. 7a and 7b, representative value "178" corresponding to the label information "11" is 11 pixels. This meets the requirements of being equal to or greater than Mth, and makes a candidate for adjusted representative value available. Further, the ratio between dynamic range "60" of the adjacent block and dynamic range "174" of the focused block is 60/174. This meets the requirement of not more than 1/Rth. Further, the difference between the intermediate value "215" of the adjacent block and the representative value "178" is "37". This meets the requirement of being less than Dth. Four pixels of the representative value "178" are found at the boundary with the adjacent block. This meets the requirement of being equal to or greater than Nth. Thus, the adjacent block is the reference block conforming to the adjusted representative value "178" inside the focused block. When the focused block is provided with the block noise reducing process, variance (dispersion) conforming to the adjacent block is assigned to the decoded value of the pixel wherein the adjusted representative value "178" inside the focused block is applied.

The following shows the event probability of each of representative values in the adjacent block of FIG. 7a:

Event probability of label information "00": P0=3/16
Event probability of label information "01": P1=5/16
Event probability of label information "10": P2=6/16
Event probability of label information "11": P3=2/16

The difference between the adjusted representative value "178" and intermediate value "215" of reference block is "37".

To obtain the adjusted decoded values dtd0 through dtd3, the aforementioned difference "37" is subtracted from representative value dtn0: 185 corresponding to label information "00" of the reference block, representative value dtn1: 205 corresponding to label information "01", representative value dtn2: 225 corresponding to label information "10", and representative value dtn3: 245 c corresponding to label information "11". This yields the following values:

Adjusted decoded value dtd0: 148
Adjusted decoded value dtd1: 168
Adjusted decoded value dtd2: 188
Adjusted decoded value dtd3: 208

The number of the pixels arranged for each of the adjusted decoded values dtd0 through dtd3 is obtained as follows, by multiplying the number of pixels "11" of the adjusted representative value "178" by P0 through P3, respectively:

Number of the pixels arranged for adjusted decoded value dtd0=2: ($11 \times 3/16$)

Number of the pixels arranged for adjusted decoded value dtd1=4: ($11 \times 5/16$)

Number of the pixels arranged for adjusted decoded value dtd2=4: ($11 \times 6/16$)

Number of the pixels arranged for adjusted decoded value dtd3=1: ($11 \times 2/16$)

When the adjusted decoded values are placed in random arrangement in the area of the pixels wherein the representative value "178" in the focused block is applied, the second-phase decoded image data 52C of FIG. 7c will be obtained, for example.

As described above, if the second-phase decoding process (block noise reducing process) is applied, the dispersion of the decoded values in the area of the pixels having the label information corresponding to the adjusted representative value inside the focused block come closer or almost equal to the dispersion of the decoded values in the reference block. This reduces block noise. Further, the mean value of the decoded values in the area provided with the pixels having the label information corresponding to the adjusted representative value inside the focused block does not exhibit any change before and after the application of block noise reducing process. This provides a level of gradation similar to that of the reference block, while the density in the entire area is kept unchanged.

For the adjusted decoded values dtd0 through dtd3, the result calculated by the following formula can be used as the adjusted decoded value:

{(the adjusted decoded value)×(the number of the pixels wherein the adjusted representative value thereof is applied)×(the event probability)}÷(the number of arranged pixels)

For example, in the case of adjusted decoded value dtd0 (148) in the aforementioned example, the result will be $148 \times 11 \times 3/16$ divided by 2=152.625. The adjusted decoded value dtd0 should be adjusted to 153. This ensures more accurate accordance in dispersion.

The following describes the case wherein there is a plurality of adjacent blocks (reference blocks) in conformity to one adjusted representative value.

When the processing of FIG. 5 is applied, a plurality of reference blocks may be extracted for any one candidate for an adjusted representative value. In this case, the candidate for an adjusted representative value is regarded as an adjusted representative value because there is a conformable reference block. A plurality of these reference blocks is weighted in conformity to the number of the pixels adjacent to the pixels wherein the adjusted representative value is applied. Then the intermediate value representing a plurality of reference blocks, the representative value compatible with each piece of label information, and event probability are obtained, which are used to provide variance, as shown in FIG. 6.

Figure 8:
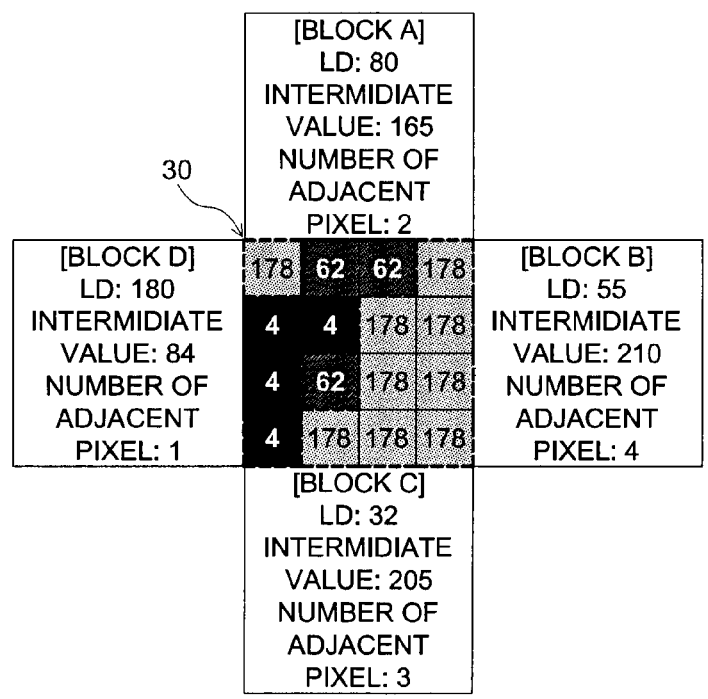
FIG. 8 is an explanatory diagram illustrating a case wherein a plurality of reference blocks is present.

In the example shown in FIG. 8, the representative value "178" in focused block 30 is the adjusted representative value. The reference blocks for this adjusted representative value are the block B and block C of the adjacent blocks A through D. FIG. 9 illustrates the dynamic ranges, intermediate values, event probability for each representative value, and the determination results of conformity to the focused block with respect to the adjusted representative value "178" of the four adjacent blocks A through D in FIG. 8. The block A does not apply because the number of the adjacent pixels is only two and is smaller than the threshold value Nth (3 pixels). The block D has a dynamic range of 180 compatible with dynamic range 174 of the focused block. The ratio thereof is 180>174×(1/Rth). This fails to meet the requirements of the Step S303 of FIG. 5, and this block does not qualify as a reference block.

The following describes a method of calculating the intermediate value representative of a plurality of reference blocks, representative value corresponding to each piece of label information, and event probability, with reference to the cases wherein, out of four adjacent blocks, reference blocks in conformity with the adjusted representative value are only the block B and block C (the case shown in FIGS. 8 and 9).

(1) Method of calculating the intermediate value dmn representing a plurality of reference blocks:

Weights are assigned to the intermediate value dmn_B of the block B and intermediate value dmn_C of the block C, using the number of adjacent pixels N_B of the block B and the number of adjacent pixels N_C of the block C. The result is used to work out the intermediate value dmn. The calculation formula is as follows:

$$dmn=[N\_B \times dmn\_B + N\_C \times dmn\_C]/(N\_B+N\_C)$$

(2) Method of calculating the event probabilities (P0 through P3) representing a plurality of reference blocks:

Weights are assigned to event probability P0_B of the first representative value in the block B and event probability P0_C of the first representative value in the block C, using the number of adjacent pixels N_B of the block B and the number of adjacent pixels N_C of the block C. The result is event probability P0 of the first representative value for the entire reference blocks. The same applies to the second through fourth representative values. The calculation formula is as follows:

$$P0=[N\_B \times P0\_B + N\_C \times P0\_C]/(N\_B+N\_C)$$

$$P1=[N\_B \times P1\_B + N\_C \times P1\_C]/(N\_B+N\_C)$$

$$P2=[N\_B \times P2\_B + N\_C \times P2\_C]/(N\_B+N\_C)$$

$$P3=[N\_B \times P3\_B + N\_C \times P3\_C]/(N\_B+N\_C)$$

wherein:

P1 is the event probability of the second representative value for the entire reference blocks;

P2 is the event probability of the third representative value for the entire reference blocks;

P3 is the event probability of the fourth representative value for the entire reference blocks;

P1_B is the event probability of the second representative value in block B;

P1_C is the event probability of the second representative value in block C;

P2_B is the event probability of the third representative value in block B;

P2_C is the event probability of the third representative value in block C;

P3_B is the event probability of the fourth representative value in block B; and P3_C is the event probability of the fourth representative value in block C.

(3) Method of calculating the first through fourth representative values (dtn0 through dtn3) of the entire reference blocks:

Weights are assigned to first representative value dtn0_B in the block B and first representative value dtn0_C in the block C, using the number of adjacent pixels N_B of the block B and the number of adjacent pixels N_C of the block C. The result is first representative value dtn0 for the entire reference blocks. The same applies to the second through fourth representative values. The calculation formula is as follows:

$$dtn0=[N\_B \times dtn0\_B + N\_C \times dtn0\_C]/(N\_B+N\_C)$$

$$dtn1=[N\_B \times dtn1\_B + N\_C \times dtn1\_C]/(N\_B+N\_C)$$

$$dtn2=[N\_B \times dtn2\_B + N\_C \times dtn2\_C]/(N\_B+N\_C)$$

$$dtn3=[N\_B \times dtn3\_B + N\_C \times dtn3\_C]/(N\_B+N\_C)$$

wherein dtn1 is the second representative value in the entire reference blocks;

dtn2 is the third representative value in the entire reference blocks;

dtn3 is the fourth representative value in the entire reference blocks;

dtn1_B is the second representative value in block B;
dtn1_C is the second representative value in block C;
dtn2_B is the third representative value in block B;
dtn2_C is the third representative value in block C;
dtn3_B is the fourth representative value in block B; and
dtn3_C is the fourth representative value in block C.

The following shows the result of the aforementioned calculation according to FIG. 8 and FIG. 9:

$$\text{Intermediate value } dmn=(4\times210+3\times205)/(4+3)=207.9$$

$$\text{Event probability } P0=(4\times5/16+3\times10/16)/(4+3)=0.446$$

$$\text{Event probability } P1=(4\times3/16+3\times1/16)/(4+3)=0.214$$

$$\text{Event probability } P2=(4\times4/16+3\times1/16)/(4+3)=0.170$$

$$\text{Event probability } P3=(4\times4/16+3\times1/16)/(4+3)=0.170$$

Similarly, when there are more than three reference blocks, values are determined by three weighting operations.

The following describes a second embodiment of the present invention.

Second Embodiment

In the first embodiment, the adjusted decoded value (dtd0 through dtd3) is placed in random arrangement in the area of the pixels wherein the adjusted representative value dt is applied in the first-phase decoding process. In the second embodiment, adjusted decoded values dtd0 through dtd3 are arranged according to the each representative value arrangement pattern in the reference block More specifically, in the area of the pixels wherein the adjusted representative value dt is applied:

first adjusted representative value dtd0 is applied as the decoded value of the pixel at the same position as the pixel wherein first adjusted representative value dtd0 inside the reference block is applied;

second adjusted representative value dtd1 is applied as the decoded value of the pixel at the same position as the pixel wherein second adjusted representative value dtd1 inside the reference block is applied;

third adjusted representative value dtd2 is applied as the decoded value of the pixel at the same position as the pixel wherein third adjusted representative value dtd2 inside the reference block is applied; and fourth adjusted representative value dtd3 is applied as the decoded value of the pixel at the same position as the pixel wherein fourth adjusted representative value dtd3 inside the reference block is applied.

FIGS. 10a, 10b and 10c show examples wherein the adjusted decoded values (dtd0 through dtd3) are arranged in the area of the pixels, to which the adjusted representative value "178" inside the focused block is applied, according to the each representative value arrangement pattern in the reference block. The encoded image data (FIG. 10a) and the first phase decoded image data (FIG. 10b) are the same as FIGS. 7a and 7b, respectively. FIG. 10c shows the result of applying the block noise reducing process (the second-phase decoding process) in order to maintain the arrangement pattern.

In this example:

first representative value dtn0 inside the reference block is 185, and the first adjusted representative value dtd0 corresponding thereto is 148;

second representative value dtn1 inside the reference block is 205, and the second adjusted representative value dtd1 corresponding thereto is 168;

third representative value dtn2 inside the reference block is 225, and the third adjusted representative value dtd2 corresponding thereto is 188; and fourth representative value dtn3 inside the reference block is 245, and the fourth adjusted representative value dtd3 corresponding thereto is 208.

Variance is provided to the relevant area inside the focused block in order to ensure that the representative value arrangement pattern inside the reference block is maintained. This provides a natural linkage and reduces block noise.

Although the specific embodiments of the present invention have been described with reference to drawings, it is to be noted that specific structures are not restricted to these embodiments. Various changes and modifications, without departing from the scope of the present invention, should be construed as being contained therein.

The concepts on the variance for the pixels wherein the adjusted representative value in the focused block is applied are not restricted to those shown in the first and second embodiments. In the first embodiment, arrangement has been made to ensure that the dispersion of the representative value within the reference block will come closer or equal to the dispersion in the area provided with variance. However, variance can be provided according to different criteria. For example, the variance can be provided at random, or at random under the conditions that the range of distribution of the variance will be equal to the reference block. The adjusted decoded value in the first embodiment can be placed in random arrangement at a random ratio in the number of pixels (wherein the event probability is ignored). A method to provide variance so that the arrangement pattern can be maintained as shown in the second embodiment is one of the methods to provide the variance without using dispersion as a reference.

In those embodiments, one of the requirements to determine conformity of the reference block is to ensure that any difference between the intermediate value of the representative values of the reference block and the candidate for adjusted representative value should not be more than the threshold value Dth (the candidate for adjusted representative value should be placed in a relationship of approximation to the range of distribution of the representative value of the adjacent block). Instead of an intermediate value, a mean value can be used. Further, instead of, or in addition to, the requirement that the difference between the intermediate value of the representative values of the reference block and the candidate for adjusted representative value should not be more than the threshold value Dth, the requirement for conformity (requirement for a relationship of approximation) can be that the candidate for adjusted representative value should be within the range of distribution of the representative value of the adjacent block, or within the range of distribution plus a prescribed close value.

The threshold values Rth, Dth, Nth and Mth given in the aforementioned embodiments are only examples without being restricted thereto. For example, threshold value Mth can be determined based on the number of pixels constituting one block, and it can be set to any appropriate value such as ½, ⅖ or ⅗ of the total number of the pixels in one block.

Without being restricted to a monotone image, the image to be decoded can be a color image.

What is claimed is:

1. An image decoding apparatus comprising:
   an input section configured to input coded image data wherein each block obtained by dividing an image into a plurality of blocks is expressed by a plurality of representative values that represent gradation value of a pixel pertaining to the block, and label information that shows which of each pixel pertaining to the block corresponds to which of the representative value;
   a Block Truncation Coding BTC decoding section configured to perform a first-phase decoding process to decode the coded image data inputted from the input section; and
   a block noise reduction process section configured to perform a second-phase decoding process to reduce block noise of the image data having been decoded by the BTC decoding section;
   wherein when each of the pixels in a focused block is decoded according to the representative value, and when a size in a range of distribution of the representative values in the focused block is equal to or greater than a prescribed multiple times the size in the range of distribution of the representative values in an adjacent block, out of the representative values of the focused block, a representative value whose difference from an intermediate value or a mean value of the representative values of the adjacent block is equal to or less than a first threshold value is assumed to be an adjusted representative value, and the block noise reduction section is configured to provide a variance to the decoded value of the pixel possessing the label information corresponding to the adjusted representative value to reduce block noise of the image data.

2. The image decoding apparatus described in claim 1, wherein the variance is provided so as to make dispersion of the decoded value of the pixel, possessing label information corresponding to the adjusted representative value, closer to dispersion of the representative value of the adjacent block.

3. The image decoding apparatus described in claim 2, wherein the variance is provided so as to vary the decoded value of the pixel, possessing the label information corresponding to the adjusted representative value, in a pattern that corresponds to arrangement pattern of the decoded values in the adjacent block.

4. The image decoding apparatus described in claim 1, wherein one of the requirements for qualifying the adjusted representative value is that, in the focused block, the number of the pixels possessing the label information corresponding to the representative value thereof is equal to or greater than a second threshold value.

5. The image decoding apparatus described in claim 1, wherein one of the requirements for qualifying the adjusted representative value is that, in the focused block, the number of the pixels possessing the label information corresponding to the representative value thereof and located on the boundary with the adjacent block is equal to or greater than a second threshold value.

6. An image decoding method comprising:
   inputting coded image data wherein each block obtained by dividing an image into a plurality of blocks is expressed by a plurality of representative values that represent gradation value of a pixel pertaining to the block, and label information that shows which of each pixel pertaining to the block corresponds to which of the representative value;
   decoding the coded image data inputted from the inputting step; and
   reducing block noise of the image data having been decoded by the decoding step;
   wherein when each of the pixels in a focused block is decoded according to the representative value, and when a size in a range of distribution of the representative value in the focused block is equal to or greater than a prescribed multiple times the size in the range of distribution of the representative value in an adjacent block, out of the representative values of the focused block, a representative value whose difference from an intermediate value or a mean value of the representative values of the adjacent block is equal to or less than a first threshold value is assumed to be an adjusted representative value, and a variance is provided to the decoded value of the pixel possessing the label information corresponding to the adjusted representative value to reduce block noise of the image data.

7. The image decoding method described in claim 6, wherein the variance is provided so as to make dispersion of the decoded value of the pixel, possessing label information corresponding to the adjusted representative value, closer to dispersion of the representative value of the adjacent block.

8. The image decoding method described in claim 7, wherein the variance is provided so as to vary the decoded value of the pixel, possessing the label information corresponding to the adjusted representative value, in a pattern that corresponds to arrangement pattern of the decoded values in the adjacent block.

9. The image decoding method described in claim 6, wherein one of the requirements for qualifying the adjusted representative value is that, in the focused block, the number of the pixels possessing the label information corresponding to the representative value thereof is equal to or greater than a second threshold value.

10. The image decoding method described in claim 6, wherein one of the requirements for qualifying the adjusted representative value is that, in the focused block, the number of the pixels possessing the label information corresponding to the representative value thereof and located on the boundary with the adjacent block is equal to or greater than a second threshold value.

* * * * *